Feb. 17, 1942.  K. W. COUSE  2,273,502
WARMING UP AND DRYING OUT MEANS FOR AUTOMOTIVE EQUIPMENT
Filed Jan. 13, 1940
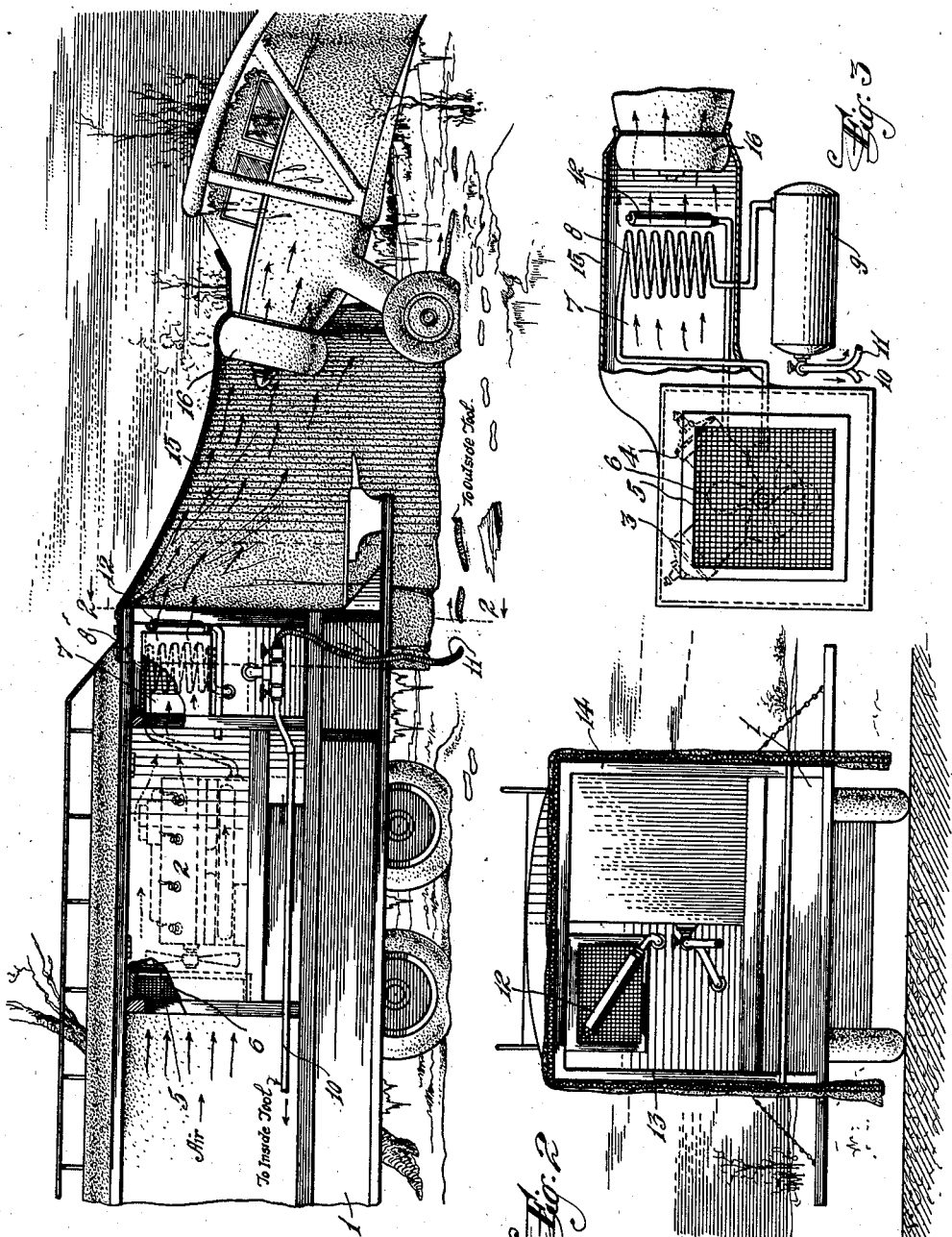
INVENTOR
Kibbey W. Couse
BY
A. D. T. Libby
ATTORNEY Patented Feb. 17, 1942

2,273,502

UNITED STATES PATENT OFFICE 2,273,502

WARMING UP AND DRYING OUT MEANS FOR AUTOMOTIVE EQUIPMENT

Kibbey W. Couse, Newark, N. J.

Application January 13, 1940, Serial No. 313,708

3 Claims. (Cl. 98—1)

This invention relates particularly to ways and means for warming up and drying out automotive equipment, especially in the field—and by "in the field" I mean places or areas remote from fixed service stations, factories and the like, including such places as an army might encounter in going across country.

For taking care of such equipment in the field, I have heretofore designed a portable machine shop, which is disclosed in my Patent D–109,942, issued May 31, 1938. This repair or machine shop is constructed so that the sides may be closed down, and when the main drive engine is not being used, or the shop is stationary, and the weather is cold, the interior may be heated by a stove burning coal, wool, charcoal, gasoline or even straw, if nothing else is available. However, with the main shop or cruiser engine running, the exhaust heaters of the engine will keep the interior warm so that a mechanic may do work on the machines provided within the cruiser.

I have found a new use for this portable machine shop or cruiser in using the same or special parts thereof, or both in combination, as a source for heating air and then blowing this heated air onto the engine of an automotive unit such as an aeroplane engine, truck or tractor engine, or the interior of any army tank, and in some cases the heated air may be passed into an enclosure such as a large tent to render the same livable.

It is therefore the general object of my invention to provide a heating and drying combination which will produce the results above set forth.

My invention will be readily understood by reference to the annexed drawing wherein:

Figure 1 is a part-sectional and part-elevational view through the rear end of the portable machine shop as interlinked with an aeroplane for warming the engine of the plane so that it can be readily started.

Figure 2 is a sectional view about on the line 2—2 of Figure 1.

Figure 3 is a diagrammatic view of the arrangements shown in Figures 1 and 2.

In the drawing, I illustrates broadly a portable machine shop within which are positioned various and sundry tools for use in repairing aeroplanes, trucks, tanks, etc. Mounted at the rear end of the cruiser is an internal combustion engine 2, shown in Figure 3 as of the V type and of suitable size. One side, 3, of the V may be used as the driving or engine side, while the side 4 is used as a compressor. Of course it is possible to make the structure so that parts of the cylinders on each side are compressors, but I find it more convenient to use them as first indicated. Mounted forwardly of the engine 2 is the usual radiator 5 and a fan 6. Rearwardly of the engine 2 is provided a chamber 7 within which are mounted heat-distributing means in the form of a coil 8 of suitable metal. This device receives the air from the compressor which is heated in proportion to the amount of compression, and after passing through the coils 8 the compressed air is passed to a receiving tank 9, to which pipes 10 and 11, going to various tools, may be connected by reason of suitable valves. The tank 9 is also preferably provided with a safety valve to relieve the pressure after a certain value has been reached, assuming that none of the compressed air is being used by the tools.

In addition to the coils 8, the chamber 7 has an exhaust heater 12 located therein, which exhaust heater is connected to the exhaust at the side of the engine 3. Attached around the rear end of the body of the machine shop and over the sides 13 and 14, which are in closed position when the structure is being used to heat the automotive engine required to be started, is a hood or tarpaulin 15 which extends from the chamber 7 to and over the engine 16 of the aeroplane. The lower folds of the tarpaulin may be clipped together if necessary.

From what has been said, it will be seen that air is driven by the fan 6 over the engine 2, picking up heat therefrom, and then into the chamber 7 where it picks up heat from the coils 8 and the exhaust heater 12, and is then driven through the passageway formed by the hood or tarpaulin 15 around the engine to be warmed up for the purpose of easy starting. Such an arrangement has been found highly essential in cold weather for the purpose of starting aeroplane, truck, tank and tractor engines.

It will be noted that in cold weather, as heretofore stated, the air within the truck is warmed to start with, either from a stove or stoves, or the cruiser engine, and as the additional heat is applied, as above explained, the air is quite highly heated when it hits the engine to be warmed up, so that it requires only a short time to heat up an engine of the automotive vehicle sufficiently to make starting thereof easy. It happens many times, during heavy rains or continuous moisture in the air, that engines of this equipment are hard to start due to leakage of ignition current over the wet surfaces. The combination described provides heated air which will quickly dry out this moisture and render starting easy. As heretofore indicated, the tarpaulin 15 may be extended into a large, enclosed tent for the purpose of heating it in cold weather.

It will be obvious that the details for carrying out the combination for warming and drying automotive equipment may be varied to a considerable extent, without departing from the spirit of my invention or the scope of the appended claims.

What I claim is:

1. Means for warming and drying automotive equipment in the field including, a travelling machine-shop cruiser having its own engine delivering driving power and heat, the cruiser also having other sources of heat such as an auxiliary engine and air compressor, a chamber on the cruiser for collecting heat from at least some of said sources, and a flexible hood extending from the chamber to the part of the automotive vehicle to be warmed and dried, and means for forcing the heated air from the chamber through the hood to the part on said vehicle covered by the hood.

2. Means for warming up the engine of an automotive vehicle including; a portable machine shop having its own driving engine and also having an auxiliary unit thereon, said unit comprising an internal combustion engine and air compressor and a fan, a chamber containing heat-distributing means connected to the compressor and an exhaust muffler for the engine located in said chamber, the fan acting to blow air across said engine and through said chamber across the muffler and heat-distributing means, and a hood extending from the chamber to and over the engine to be started.

3. Means for warming and drying automotive equipment in the field including; a portable machine shop having its own driving engine and also having an auxiliary unit therein, said unit comprising a combined internal combustion engine and air compressor and a fan, a chamber having coils therein through which the hot air from the compressor is passed, an exhaust heater for the engine of the auxiliary unit also located in the chamber, and a flexible hood extending from the chamber to the part of the automotive vehicle to be warmed and dried, said fan acting to force air over the engine of the auxiliary unit and through the chamber across said coils and exhaust heater and through the hood.

KIBBEY W. COUSE.